Dec. 31, 1929.  T. ROZANKOVICH  1,742,100
SPRING WHEEL
Filed Jan. 14, 1929   2 Sheets-Sheet 1

Thomas Rozankovich,
INVENTOR

WITNESS:  BY  Victor J. Evans
ATTORNEY

Dec. 31, 1929.　　　T. ROZANKOVICH　　　1,742,100
SPRING WHEEL
Filed Jan. 14, 1929　　2 Sheets-Sheet 2
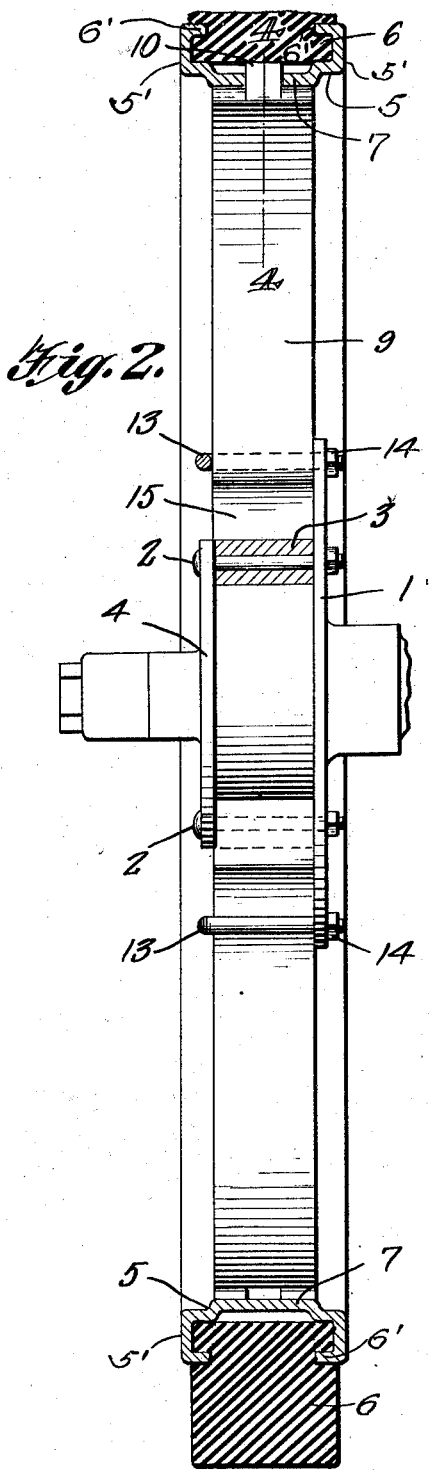
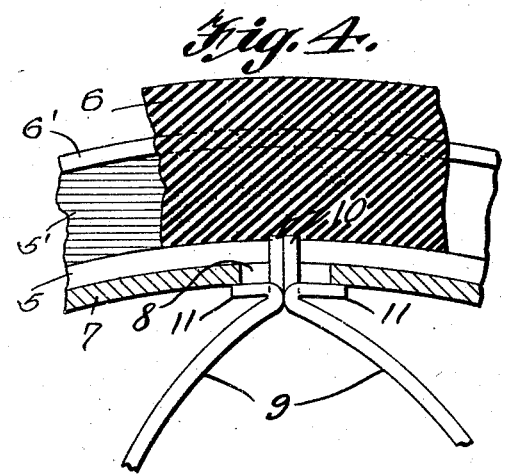
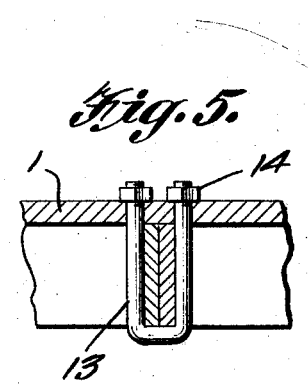
Thomas Rozankovich,
INVENTOR
BY Victor J. Evans
ATTORNEY Patented Dec. 31, 1929

1,742,100

UNITED STATES PATENT OFFICE

THOMAS ROZANKOVICH, OF GALVESTON, TEXAS

SPRING WHEEL

Application filed January 14, 1929. Serial No. 332,392.

My present invention has reference to spring wheels for vehicles, and my object is the provision of a wheel construction of this type which will not only afford as great a resiliency as a pneumatic tired wheel but which will, to a great extent absorb the shocks and jars to which a vehicle equipped with either pneumatic or the ordinary wheels are subjected.

A further object is the provision of a spring wheel, in which the spring spokes are so constructed and arranged as to afford a cushioning action therebetween and further wherein the said spokes have their outer ends held in slots in the tire rim or felly incident to the pressure exerted by said spokes, and whereby a limited but desired movement of certain of the spokes, when an excess pressure or load is directed thereagainst, will be compensated for without liability of the breakage of the spokes.

To the attainment of the foregoing and many other objects which will present themselves, the improvement also resides in certain other novel features of construction, combination and operative association of parts, one satisfactory embodiment of which is disclosed by the accompanying drawings.

In the drawings:

Figure 2 is a sectional view approximately on the line 2—2 of Figure 1.

Figure 4 is a detail sectional view approximately on the line 4—4 of Figure 2.

Figure 5 is a detail sectional view approximately on the line 5—5 of Figure 1.

Figure 1:
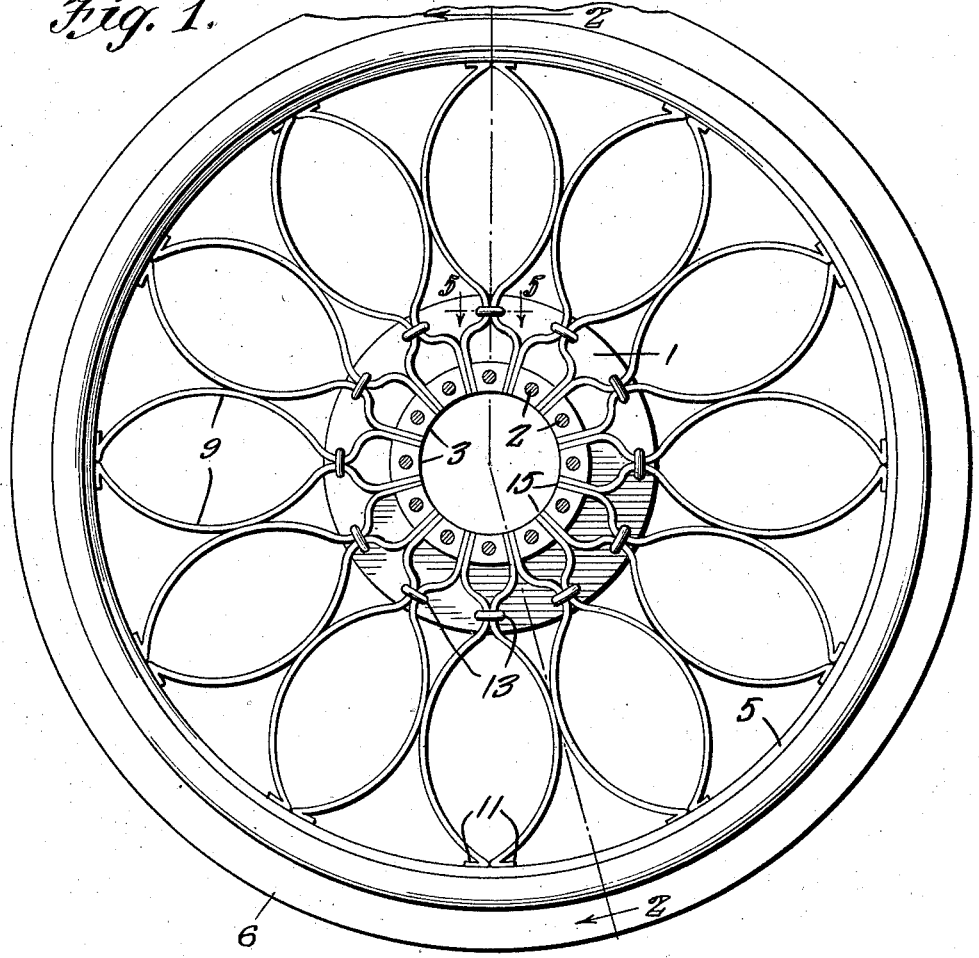
Figure 1 is a side elevation of a wheel constructed in accordance with this invention, one of the hub plates being removed and the holding bolts therefor being in section.
Figure 3:
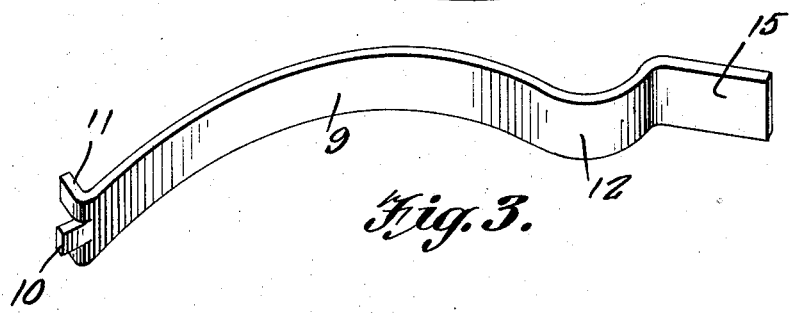
Figure 3 is a perspective view of one of the spokes.

In the showing of the drawings the hub of my improved spring spoke wheel comprises a disc 1 which has one of its faces, at points adjacent to its bore, provided with equidistantly spaced bolt openings. The bolts 2, that pass through these openings also pass through comparatively small segmental spacer blocks 3.

The bolts 2 also pass through openings in the outer disc member 4 of the hub.

The rim of the wheel is of metal and is indicated in the drawings by the numeral 5. The rim is provided with the side flanges 5' which preferably have their outer edges inturned 6', so that the body of the rim and the said flanges provide a continuous pocket for the inner and reduced circumferential portion of a compressible tread or tire 6.

By reference to Figure 2 of the drawings it will be seen that the inner periphery of the rim 5 has its central portion slightly bulged inwardly, as at 7, and this central portion of the rim, at equidistantly spaced intervals is centrally formed with substantially rectangular slots 8.

The spring spokes for the wheel each includes an arched body portion 9 whose outer end is formed with a centrally projecting finger 10 and with angle flanges 11 at the opposite sides of the finger. The flanges 11 extend in the same direction but the flanges of the cooperating pairs of spokes are oppositely directed. These flanges rest on the inner periphery of the rim 5 while the fingers 10 are received through the slots 8 in the said rim or felly.

By reference to the drawings it will be seen that the spokes are arranged in pairs and that the arched portions thereof are centrally in contact with each other. From the rounded or arched portions each of the spokes is rounded inwardly, as at 12, and brought into contacting engagement. There is passed over these pairs of contacting portions 12 U-bolts 13 which also pass through the disc 1, the arms of the bolts 13 being, of course, engaged by nuts 14. From the rounded portions the spokes are formed to provide straight extensions 15. These extensions are received between the pairs of segmental spacer blocks 3 as clearly disclosed by the drawings and, of course, are covered by the outer disc 4 of the hub.

Because of the contacting engagement of the pairs of spring spokes with each other the fingers 10 will at all times be held in the slots or openings 8 in the rim or felly. Also the contacting engagement of the spokes serve to absorb and deflect shock which would otherwise be imparted to the vehicle and upon the wheels upon which the vehicle is arranged. By arranging the fingers 10 in the somewhat elongated openings 8 undue pressure upon any one or any pairs of spokes will be overcome as the said spokes will be permitted not only a yielding but a sliding movement on the felly, so that liability of breakage of the spokes when the vehicle is subjected to an overload will be effectively overcome.

It is thought that the foregoing description when read in connection with the accompanying drawings will fully set forth the construction and advantages of my improvement to those skilled in the art. It is to be understood, however, that I do not wish to be limited to the precise details herein set forth and, therefore, hold myself entitled to make such changes therefrom as fairly fall within the scope of what I claim.

Having described the invention, I claim:

1. A spring vehicle wheel including a hub and a rim, said rim having its inner periphery provided with equi-distantly spaced somewhat elongated openings, and said rim carrying a compressible tire, spring spokes arranged in pairs fixed to the hub of the wheel, each spoke having an arched body and the outwardly arched portions of the respective pairs of spokes being centrally in contact with each other, and said spokes having reduced fingers which are received in the mentioned openings in the rim.

2. A spring vehicle wheel including a hub and a rim, said rim having its inner periphery provided with equidistantly spaced somewhat elongated openings, said rim carrying a compressible tire, spring spokes arranged in pairs fixed to the hub of the wheel, each spoke having an arched body and the outwardly arched portions of the respective pairs of spokes being centrally in contact with each other, and said pairs of spokes having their outer ends centrally formed with fingers which are received in the mentioned openings and with flanges at the opposite sides of the fingers which contact with the inner periphery of the rim.

3. In a vehicle, a hub and a metal rim having side flanges whose outer edges are inwardly directed and its periphery bulged inwardly, and said portions of the rim providing a pocket for the inner portion of a compressible tread and said bulged periphery of the rim being provided with equidistantly spaced somewhat elongated openings, leaf spring spokes arranged in pairs and each including an arched body portion having its outer end formed with a finger to be received in the mentioned openings and having flanges at the sides of the finger to contact with the inner periphery of the rim, and the pairs of said oppositely arched spokes being centrally in contact with each other, said pairs of spokes from their arched portions having their inner ends rounded inwardly and contacting with each other, U-bolts passing over these portions of the spokes and secured to the hub and said spokes from their said latter contacting portions being formed with straight extensions which are also fixed to the hub.

In testimony whereof I affix my signature.

THOMAS ROZANKOVICH.